June 27, 1933. R. A. GORTNER ET AL 1,915,568
RECOVERY AND PURIFICATION OF MATERIALS BY ELECTRODIALYSIS
Filed Aug. 20, 1928
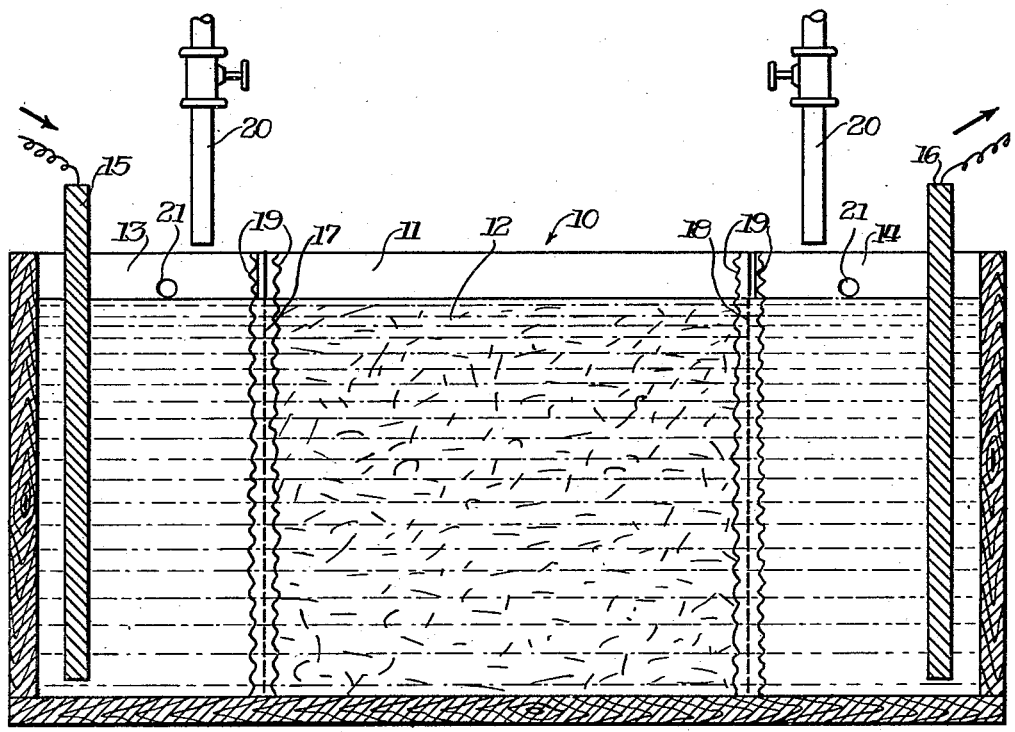
Inventors
Ross Aiken Gortner
Walter F. Hoffman.
By W. Bartlett Jones Atty Patented June 27, 1933

1,915,568

UNITED STATES PATENT OFFICE

ROSS AIKEN GORTNER, OF ST. PAUL, AND WALTER F. HOFFMAN, OF CLOQUET, MINNESOTA, ASSIGNORS TO NORTHWEST PAPER COMPANY, OF CLOQUET, MINNESOTA, A CORPORATION OF MINNESOTA

RECOVERY AND PURIFICATION OF MATERIALS BY ELECTRODIALYSIS

Application filed August 20, 1928. Serial No. 300,663.

The present invention relates to the treatment of certain products or compounds containing both mineral and organic matter in association, such as the metal salts of organic acids, to break down the compounds or to separate mineral from organic portions. It has particular reference to the treatment of natural products, such as fruits and vegetable matter containing useful substances of pectin-like character.

The invention relates not only to the isolation of such materials but also to the purification of similar products otherwise isolated or prepared.

Natural pectin is believed to be a metal salt of an organic acid which acid has characteristic properties making it readily recoverable by the process of the present invention after the metal has been removed from the salt. Pectin occurs in nature in many fruits and vegetables as a calcium or magnesium salt of an acid. It is found in vegetables such as carrots and turnips, in leaves, in apples and many other fruits, especially the lemon and grapefruit of the citrus family. All of these materials may be used as raw material for the present invention when pectin is desired. It is preferred to use the pulp and rinds of the citrus fruits, and the vegetable tubers. Pulp of apples is readily obtainable as a raw material, known as "apple pomace", and it is at present one very important commercial source of pectin produced by chemical extraction. Pectin is employed largely in food products, such as jelly, and it is a particular substance determining the gelation of natural fruit juices. In purified and concentrated form it is available on the market for addition to foods to cause gelation.

In use, pectin functions not as a salt but as the free acid, and it is prepared for the market as the free acid. As such it is known as pectin. It is colloidal in nature in water, and for that reason it is readily prepared by the present invention.

In order to illustrate the invention the process of preparing pectin will be described in detail. The invention is therefore not to be considered as limited to application for the production of pectin from raw material but broader in scope and applicable to other processes as expressed in the appended claims.

The usual method of preparing pectin comprises extraction from its source with an appropriate solvent, precipitating the pectin from the solvent, and further purifying the precipitated product. The process requires a number of steps, special attention, and a variety of reagents; and it is a difficult and expensive process compared to the process of the present invention. This can be ascertained by reference to Dore in the Journal of Industrial and Engineering Chemistry, vol. 16, page 1042 (1924).

Generally, the present invention as applied to pectin comprises subjecting the source of pectin to the disruptive effect of an electric potential and the resulting current so that the metal portion is freed from the organic nucleus, and carrying the freed metal away from the source and the resulting organic residue by the migratory influence of the current.

The process may be carried out in apparatus having the essential features of the exemplary cell shown in the accompanying drawing. A box-like structure 10 has three compartments of which 11 is the product compartment in which the raw material is placed and the product obtained. Raw material is indicated by the numeral 12. The cell has other compartments, herein shown as electrode compartments 13 and 14 containing electrodes 15 and 16 which may be of carbon. So-called semi-permeable membranes serve as partitions between the product compartment and the two electrode compartments. The function of the partition is to separate the liquid in adjacent compartments, yet to provide a liquid conductance path from one electrode to the other. Such membranes permit passage of electric current but not a flow of liquid. The passage of current is attended by the migration of charged particles towards the electrodes. Positively charged particles move toward the cathode 15 and negatively charged particles move toward the anode 16. The charged particles which may be present include ions, such as cations and anions of elemental or complex structure, and also heavier and larger charged particles which may be colloids. Some ions may be present which are colloidal in size and which do not pass through a suitably chosen membrane. Smaller ions may readily pass the membrane, but non-ionic and colloidal particles and the ions of colloidal magnitude are restrained by the membrane. Membranes of collodion, cellophane, animal tissue, and materials of similar closed structure are suitable for the purpose, and in the drawing are indicated by the numerals 17 and 18, each membrane being supported on both sides by sheet material such as canvas 19.

Means is provided to keep the particular ionic concentrations in the electrode chambers at a lower value than the concentration of similar ions in the product chamber. This is best accomplished by dilution of the liquid in the electrode chambers. Where water is employed as a conducting and ionizing medium an inflow of water is provided at 20 and an outflow at 21.

In operation to produce pectin, the middle compartment may be packed with an aqueous suspension of lemon pulp or pulped rinds, or other pectin-bearing substance, such as apple pomace. The consistency of the mixture of pulp and water has a bearing on the efficiency of the process. If a low pulp concentration is used current is carried largely by the water; and in spite of the fact that a proportionately smaller amount of material is introduced to be recovered from the pulp, it will take a much longer time than if greater amounts of pulp are employed for the same volume of the mixture, and a much greater power consumption per unit of product will result. If too much pulp and too little water are used, the pulp will pack and form a mechanical barrier to the migration of the ions, and the colloid particles formed will also contribute to establish the barrier. In placing the pulp into the compartment a sufficient looseness should be maintained to provide liquid channels through the compartment wherein the ions may migrate freely. The natural vegetable material is an example of solid material having a high specific surface, due to the fibrous character of the vegetable matter. There are indications that there is a conducting path along the surface of the fiber which has less resistance than a similar water channel, and this is believed to be due to the formation of electrical double layers forming two adjacent paths of high conductivity. It also appears that when pulp is present in sufficient quantity to establish such surface paths across the product compartment, the electrical and time efficiency of the process is greatly improved and the process made commercially practicable. Reference is made to the applicants' joint Patent No. 1,878,235 of September 20, 1932, for further explanation of the increased efficiency hereinabove described.

Any potential may be applied across the electrodes, but preferably one is chosen so that an effective current flows in quantity insufficient to cause undue heating of the mass. A current density of about one-half to two amperes per square foot of compartment cross section is maintained. It is to be understood that as the treatment progresses, the electrolytes are removed from the middle compartment into the electrode compartments and from there washed out of the apparatus. In consequence the internal resistance of the cell will increase, and a change in applied potential may be desirable to maintain an effective current. The current is continued until the desired quantity of the metal component of the natural pectin has been removed leaving the equivalent in free acid pectin. This acid is colloidal and but slightly ionized. The colloidal free acid, the residual pulp and any other solids which may be present are restrained by the membranes from leaving the product compartment. Any free acids which accompany the pectin in the source, or which may be formed in the process, and which are ionized, such as citric acid, are moved as anions into the anode compartment in amount depending in part upon the ionic concentration. When the desired degree of completion or purification of the process has been attained the current is stopped and the colloidal solution of the pectin is mechanically separated from the solid parts in the middle compartment. The pulp may be discarded and the pectin product in colloidal solution may be concentrated to form a syrup, or otherwise recovered.

It is readily seen that an impure pectin may be treated in the same way for the removal of mineral matter or of contaminating electrolytes, such as citric acid, or other ionizing compounds, so as to concentrate in the product the desired pectin substance. This is preferably done in the presence of fiber or material of similar function to provide the desired economy.

It is to be noted that in using lemons a free acid, such as citric, may be present, and this may aid in causing the separation of the metal and the organic radicle so that the metal component may be carried away by the electric current. The invention therefore contemplates the presence or the addition of electrolytes which may aid in the separation and removal of the components of the base material. Although we have shown water as the vehicle for migration it is well known that other liquid media are electrically conductive and can induce ionization of compounds. The invention, therefore, contemplates any suitable electrically conducting medium as a vehicle for the pulp or material to be treated.

In those instances where the term "metal" is used in the specification and in the claims, we include the ammonium radicle NH₄— as a metal, for the reason that it is generally considered to be in all respects the equivalent of metal ions when joined to acids as in the formation of salts. It will be readily understood that the present invention is applicable to materials of pectin-like character which may be associated with pectin, and which may be related thereto, and which may function like pectin. The invention contemplates not only the preparation and purification of pectin in the manner herein described, but also the purification of pectin concentrates however they may be obtained. Reference is made to applicants' copending application Serial No. 621,868, filed July 11, 1932, wherein the product is described and claimed. The present application relates to the process as defined by the appended claims.

We claim:

1. The method of extracting pectin-like substance from containing material which comprises suspending the material in water applying an electric potential to create an effective current through the mass, permitting ions to move away from the material, restraining movement of the material and the resulting pectin-like substance, and separating the resulting solution of the pectin-like product from said material.

2. The method of securing pectous substance which comprises suspending material containing pectin in water, applying an electric potential to create an effective current through the mass, permitting ions to move away from the mass, restraining movement of the material and the resulting pectin product, and separating the solution of the pectin from said material.

3. The method of securing pectous substance which comprises suspending citrus pulp containing pectin in water, applying an electric potential to create an effective current through the mass, permitting ions to move out of the mass, restraining movement of the mass and the resulting pectin product, and separating the pectin solution from the pulp.

4. The method of securing pectous substance which comprises suspending pectin-containing material in water in an electric cell, passing an electric current through the cell, permitting the resulting ions to migrate towards the electrodes, restraining the movement of the material and the pectin product, removing impurities collected at the electrodes, and recovering pectin from the material remaining in the cell.

5. The method of securing a soluble pectous substance which comprises suspending pectin-containing material in water in an electric cell, passing an electric current through the cell, permitting the resulting ions to migrate towards the electrodes, restraining movement of the material and the residual soluble pectous product, and separating the soluble pectous product from the material remaining in the cell.

6. The method of securing pectous substance which comprises suspending material containing pectin in water in an electric cell, passing an electric current through the cell, permitting the resulting ions to migrate towards the electrodes, restraining movement of the material and the pectin product, maintaining at the electrodes a concentration of impurities from the mass which is lower than the concentration remaining in the mass, and recovering pectin from the material remaining in the cell.

7. The method of purifying a pectous substance from associated metal capable of forming cations, which comprises mixing the material to be purified with an electrically conducting and ionizing medium, applying an electric potential to create an effective current through the mass, permitting the cations to migrate out of the mass, and restraining movement of the resulting pectous product from the mass.

8. The method of treating a pectin product associated with metal capable of forming cations which comprises placing the pectin product in water in a chamber of an electric cell provided with pectin restraining diaphragms in the presence of pulp packed between the diaphragms with the provision of liquid channels across the chamber between the diaphragms, subjecting the material in the chamber to a flow of a direct current of electricity between the diaphragms, whereby cations are removed from the mass, and removing the resulting pectin solution from the pulp.

9. The method of treating a pectin product associated with metal capable of forming cations which comprises placing the pectin product in water in a chamber of an electric cell having pectin restraining diaphragms in the presence of a solid material of high specific surface packed between the diaphragms with the provision of liquid channels across the chamber between the diaphragms, subjecting the material in the chamber to a flow of direct current of electricity between the diaphragms, whereby cations are removed from the mass, and removing the resulting pectin solution from the solid material.

10. The method of producing pectin from citrus fruits which consists of packing a pulp derived from citrus fruits containing pectin into an electric diaphragm cell, submerging the packed material with water, passing a direct current of electricity through the cell, permitting cations to leave the mass, restraining movement of the resulting pectin from the mass, and removing the resulting pectin solution from the pulp.

In witness whereof we have hereunto affixed our signatures.

ROSS AIKEN GORTNER.
WALTER F. HOFFMAN.